3,728,093
PRODUCTION OF SYNTHETIC PIPELINE GAS
William W. Cofield, Houston, Tex., assignor to Transcontinental Gas Pipe Line Corporation, Houston, Tex.
Filed Oct. 14, 1971, Ser. No. 189,144
Claims priority, application Great Britain, Oct. 16, 1970, 49,372/70
Int. Cl. C01b 2/14
U.S. Cl. 48—190  8 Claims

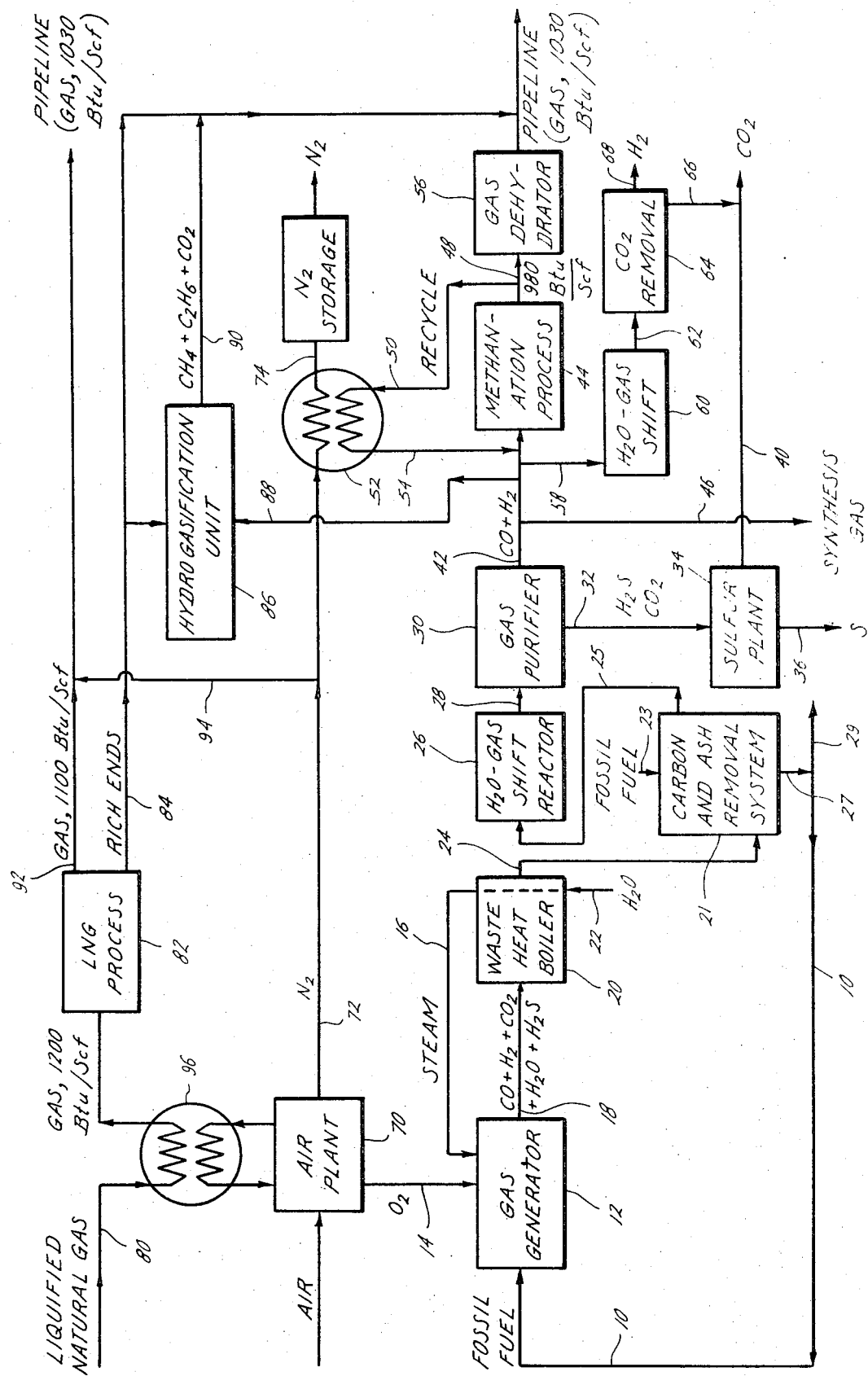

ABSTRACT OF THE DISCLOSURE

Apparatus for production of synthetic pipeline gas of desired heating value by integrating a system of producing synthetic gas from a carbonaceous material in a gas generator with a system of processing a liquefied natural gas whereby the leaner output from the gas generator is advantageously combined with the richer output from the liquefied natural gas system to provide the desired gas heating value, and the cold temperatures of the liquefied natural gas system is advantageously utilized in the gas generator system.

BACKGROUND OF THE INVENTION

The present invention is directed to improved methods of and systems for the production of pipeline gas having a heating value of approximately 1000 B.t.u./s.c.f. (British thermal units per standard cubic foot) by synthetic means. The synthetic pipeline gas is produced by processing carbonaceous materials such as fossil fuels including oil, coal, lignite, gas and other such materials as well as these materials combined with sulfur or sulfur compounds and ash. In addition, the present invention includes a method and system of apparatus for processing a liquefied natural gas (LNG) stream to produce pipeline gas and this LNG system advantageously may be combined with the previously described system for synthesizing pipeline gas as will be explained hereafter.

SUMMARY

The present invention is directed to combining the low B.t.u. output from synthetic pipeline gas produced in a gas generator system from a carbonaceous material with the high B.t.u. output from synthetic pipeline gas produced from processing liquefied natural gas to provide a synthetic pipeline gas desired heating value at enhanced economics.

A still further object of the present invention is the thermal combining of a carbonaceous gasification system with an LNG processing system in a way that the cold temperatures of the LNG system is advantageously combined with the excess heat that must be rejected in the carbonaceous gasification system.

Still a further object of the present invention is the combining of a carbonaceous gasification system, an air plant, and an LNG gas processing system to provide a synthetic pipeline gas of approximately 1000 B.t.u./s.c.f. with saleable by-products to increase the economics of the system.

A further advantage of the present invention is its applicability to processing of otherwise undesirable fuel containing sulfur or sulfur compounds and ash. As a result, highly desirable, non-polluting pipeline gas may be obtained together with elemental sulfur and other useful by-products such as carbon dioxide ($CO_2$) and hydrogen ($H_2$). Consequently, fuels that ultimately would pollute the atmosphere upon being consumed are converted to a pollution-free form and the pollutants are recovered for further use.

BRIEF DESCRIPTION OF THE DRAWING

The drawing is a schematic diagram of the flow process of the present invention.

DESCRIPTION OF THE PREFERRED EMBODIMENT

With reference to the attached drawing, fossil fuel in the form of oil, gas, coal, lignite or other carbonaceous material in line 10 (from a source as will be explained) is passed to a gas generator 12 for purposes of converting the fossil fuel material to carbon monoxide (CO) and hydrogen ($H_2$) with by-products such as carbon dioxide ($CO_2$), water ($H_2O$) and hydrogen sulfide ($H_2S$). The gas generator may be of any suitable type similar to, for example, that disclosed in U.S. Pat. No. 2,582,938 issued Jan. 15, 1952 to Du Bois Eastman et al. Typically, the gas generator system 12 converts the fuel streams 10 to the stated compounds by reaction of the fuel with oxygen such as is provided by line 14 and steam such as is provided by line 16.

With respect to operation of the gas generator 12 and the system as will be described, it is preferred that pressure conditions be such that pressure will equal or exceed that of the pipeline or other point of destination into which the desired gas product synthesized according to the present invention is discharged. For example, pressures of 500 pounds per square inch (p.s.i.) and greater are preferred in view of the fact that gas transmission lines generally are operated at such elevated pressures.

The carbon monoxide, hydrogen and by-products produced in the gas generator 12 are passed by means of line 18 preferably to a waste heat boiler unit 20. In the waste heat boiler, the stream 18 exchanges heat with a water stream 22 whereby the water forms steam that passes to line 16 for use in the gas generator 12.

The gaseous stream in line 24 including carbon monoxide, hydrogen and carbon dioxide is preferably passed to a carbon and ash removal system 21. The system 21 may be any suitable apparatus whereby fossil fuel (when in liquid form) is passed by the line 23 to the system 21 for purposes of absorbing molecular carbon, ash and any metallic materials from the gas in line 24. The clean gas is then transmitted via the line 25 to a water-gas shift reactor 26 as will be described.

After the absorption function just described, the fossil fuel from the system 21 is transmitted by the line 27 to the line 10 for feed to the gas generator 12 as explained. In addition, a side stream 29 of preferably less than ten percent of the fossil fuel stream 27 is withdrawn for use, for example, as fuel for auxiliary boilers or power generation, etc., whereby the absorbed carbon is consumed, hydrogen sulfide is converted to sulfur dioxide and recovered, and the ash and metals are recovered by suitable means. Of course, carbon absorbed in the fuel in line 10 is consumed in the gas generator 12.

It will be understood that when the fossil fuel feedstock to the gas generator 12 is in other than liquid form, the carbon and ash removal system 21 may be eliminated. In such case, the line 24 may pass directly to the reactor 26.

In view of the fact that one of the objectives of the present invention is to provide a pollution-free pipeline gas synthesized from fossil fuels and the like, and since carbon monoxide and hydrogen are generated for this purpose in the gas generator 12, it is preferable to provide carbon monoxide and hydrogen in a suitable proportion as a feedstock to a methanation process to be described hereafter. The ratio of hydrogen to carbon monoxide in the product stream 18 from the gas generator 12 (and likewise in the line 24) is typically 1–1.50 volume of hydrogen to 1 volume of carbon monoxide (measured under standard conditions). For purposes of conversion of these materials to methane, the most desirable ratio is about 3 volumes of molecular hydrogen to about 1 volume of carbon monoxide. In order to attain this desired ratio, the compositions in line 24 are passed to the water-gas shift reactor 26 which may be any suitable apparatus or system for so adjusting the proportions of hydrogen to carbon monoxide. For example, a shift reactor that may be employed in the present process is described in U.S. Department of Interior, Office of Coal Research, Research and Development Report No. 22, Interim Report No. 4, section 600, p. 31.

Due to the fact that conversion of carbon monoxide and hydrogen to methane is carried out usually by sensitive catalyst systems, virtually all sulfur or sulfur-containing compounds must be removed and substantially all carbon dioxide likewise must be removed from the carbon monoxide and hydrogen stream. Accordingly, from the water-gas shift reactor 26, the carbon monoxide and hydrogen stream passes by means of a line 28 to a gas purifier system 30 whereby virtually all sulfur and sulfur-containing compounds are removed. It is desirable also to remove substantially all of the carbon dioxide since the latter material would otherwise act as a diluent in the main stream. The gas purifier 30 may be any suitable system such as that which employs hot carbonate in combination with iron sponge or zinc oxide type processing. Alternatively, methanol extraction types of systems may be employed as the gas purifier such as those sold under the trademarks "Rectisol" and "Purisol." In any event, the hydrogen sulfide and other sulfur-containing materials and carbon dioxide are removed from the main gas stream through line 32 and are passed to a sulfur unit or processing system 34. The sulfur plant or processing system 34 may be any suitable type of system such as a Claus system which is well known to those skilled in the art whereby either elemental sulfur or other sulfur-containing materials are recovered and drawn off such as by means of the line 36 while carbon dioxide is drawn off by means of a line 40 as an off-gas. Both the sulfur and $CO_2$ may be used further as desired.

In the line 42 emanating from the gas purifier 30 is the mixture of molecular hydrogen and carbon monoxide preferably in a three to one volumetric ratio with minor amounts of carbon dioxide. These compositions are then passed to a methanation process 44 or may be diverted such as by means of a line 46 for further use, the gas stream at this point being designated as "synthesis gas" which may be used, for example, in the manufacture of ammonia or suitable for use as a low B.t.u. type of boiler fuel.

In the methanation process unit 44, the hydrogen and carbon monoxide (preferably in a three to one volume ratio) are combined by a catalyzed reaction to form methane. The process and/or apparatus for effecting this catalyzed reaction may be any suitable means well known in the art such as, for example, that disclosed in November 1949, in "The Catalytic Synthesis of Methane . . . ," Dent and Hebden, Publication GRB51, The Gas Research Board, Beckenham, Kent, England. Fixed as well as fluidized catalyst beds most of which utilize a nickel base type of catalyst deposited on ceramic material may be employed in the present invention. A nickel catalyst is suitable for conversion of hydrogen and carbon monoxide to methane although other catalysts may be used as will be appreciated by those skilled in the art.

In the catalyzed methanation process of the unit 44, it is desirable to utilize hot gas recycle in order to control the surface temperature of the catalyst bed in the unit thereby avoiding physical degradation of the catalyst itself. To effect the hot gas recycle, the methane product withdrawn from the unit 44 via line 48 is partially diverted by means of the line 50 to a suitable heat exchanger 52 whereby the methane stream is cooled and is passed by the line 54 back to the methanation unit 44.

The product stream in the line 48 which is comprised substantially of methane with very minor amounts of carbon dioxide is passed to a gas dehydrator 56 for removal of water vapor if necessary prior to passage of the methane gas stream to a pipeline. For example, pipeline gas specifications typically provide for no more than six pounds of water vapor per million standard cubic feet of gas and any suitable gas dehydrator unit 56 may be employed to attain this result. Consequently, the effluent from the gas dehydrator 56 is a gas product having in the range of from 950 to approximately 100 B.t.u./s.c.f. heating value prior to any blending for injection into a pipeline.

The synthesis gas stream in line 42 may be diverted as desired by means of a line 58 prior to methanation and may be subjected to processing in a water-gas shift reactor 60 similar to the unit described in relation to reactor 26. In the water-gas shift reactor 60, the carbon monoxide reacts with steam to form carbon dioxide and providing further hydrogen. These products are withdrawn by means of the line 62 to a suitable unit 64 whereby carbon dioxide is separated from hydrogen and may be combined, for example, by means of a line 66 with the off-gas carbon dioxide in the line 40. The hydrogen separated from the carbon dioxide is discharged such as the synthesis of ammonia or in such refinery operations as hydrocracking, hydrodesulfurization and the like.

Returning in the discussion to the gas generator 12, the source of oxygen in the line 14 may be any suitable source but preferably is a standard air separation unit as is well known to those skilled in the art. In the schematic flow diagram, the air separation unit is designated as an "air plant" 70 which processes atmospheric air to produce oxygen and nitrogen. The air plant 70 should provide oxygen under sufficiently high pressure to the gas generator 12 for the same reasons of pressure conditions as have been previously described. In addition, the oxygen stream 14 produced by the air plant 70 preferably contains at least 95% oxygen in order to avoid any problem of diluents entering the gas generator and subsequent process streams and to maintain proper B.t.u. value of the product gas.

Nitrogen ($N_2$) produced by the air plant 70 is represented in the drawing as being drawn off in line 72 and passed to the heat exchanger 52 whereby the cold condition of the nitrogen provides cooling to the hot gas recycle stream 50 as previously mentioned. The nitrogen is then passed such as by the line 74 to suitable storage for any desired usage or disposition.

In a further embodiment of the present invention, liquefied natural gas (LNG) is provided on a continuous basis for production of pipeline gas of a desirable heating value (e.g., about 1030 B.t.u./s.c.f.). Thus, with reference to the drawing, LNG is transmitted through the line 80 to an LNG processing unit designated by the reference numeral 82. The LNG typically has a heating value of approximately 1200 B.t.u./s.c.f. and is comprised of hydrocarbons such as methane, ethane, propane and heavier components. The LNG processing unit 82 may be any suitable system such as a distillation or fractionation arrangement whereby propane and heavier molecular weight components are separated from the lighter methane and ethane components and the former are drawn off such as by means of a line 84 and are termed "rich ends" with reference to the drawing. These rich ends advantageously may be passed to a hydrogasification unit represented by the reference numeral 86 for reaction with carbon monoxide and hydrogen supplied such as by means of the line 88 from the synthesis gas in the line 42 previously identified. The hydrogasification unit 86 may be any suitable system well known to those skilled in the art whereby the rich ends are reformed in the presence of carbon monoxide and hydrogen to form a stream rich in methane or a stream comprising methane, ethane and minor amounts of carbon dioxide. An example of the hydrogasification reactor or system is disclosed, for example, in "The Production of Gas From Oil by Continuous Catalytic Steam Reforming and Hydrogasification," Nicholas and Ward, World Petroleum Conference, Mexico City, 1969. The product stream from the hydrogasification unit 86 shown in the drawing is designated by reference numeral 90 and may be recombined in any desired proportion with the stream 84 containing the rich ends for purposes of enrichment of the gas product in the stream 48 from the methanation process 44 to produce a gas suitable for injection in a pipeline and having the desired heating value.

With reference once again to the LNG processing unit 82, the ethane, methane and lighter molecular weight components separated from the rich ends are passed by the line 92 to further processing such as injection in a gas pipeline. However, prior to injection into a pipeline, a portion of the nitrogen stream in the line 72 may be diverted such by means of the line 94 for mixing with the gas in the line 92 to provide a pipeline gas of the desired heating value, preferably approximately 1030 B.t.u./s.c.f. As will thus be appreciated, the LNG provides not only a pipeline gas (in the line 92) of the desired heating value but also provides rich ends which may be reformed as described with respect to the hydrogasification unit 86 resulting in a methane-rich stream 90 for mixture with the product stream 48 of the methanation process which likewise yields a suitable pipeline gas of the desired heating value.

An added advantage of the use of the liquefied natural gas stream 80 as previously described lies in utilization of the cold condition of the LNG stream as a refrigeration source for combination with the air plant unit 70. As is well known in the art, air plants such as those described require large amounts of refrigeration and the cold condition of the LNG stream 80 is uniquely adaptable for passage through a suitable heat exchanger 96 for heat exchange with the air plant 70. Consequently, the LNG stream 80 is heated prior to further processing in the LNG unit 82 and the air plant 70 receives refrigeration as will be understood by those skilled in the art.

As will be further understood by those skilled in the art, the LNG stream in the line 80 may be utilized as a coolant at other points in the system subject of this application such as in the gas purifier unit 30 where a cooling medium is required as well as in the stream 48. In the latter instance, the methane-rich stream 48 is preferably cooled prior to passage to the gas dehydrator 56 and prior to further use as pipeline gas since the temperature of pipeline gas generally should not exceed approximately 115° F. It will also be appreciated that the gas in the stream 92 and the rich ends in the stream 84 emanating from the LNG process unit 82 may be diverted as desired for heat exchange and utilization of the cold condition of both streams where necessary.

Finally, when the gas stream in the line 48 is at a suitably high pressure, it will be advantageous to provide in that line suitable energy recovery means coincident with pressure reduction when feasible. For example, gas turbines for power generation and the like may be employed in line 48 to recover energy from the gas stream.

The present invention, therefore, is well adapted to carry out the objects and attain the ends and advantages mentioned, as well as others inherent therein. While presently preferred embodiments of the invention are given for the purpose of disclosure, numerous changes in the details of construction and arrangement of parts will readily suggest themselves to those skilled in the art and are encompassed within the spirit of the invention and the scope of the appended claims.

What is claimed is:

1. An apparatus for the production of synthetic pipeline gas of desired heating value from carbonaceous materials comprising,
    a gas generator receiving the carbonaceous material, oxygen and steam producing an output of carbon monoxide and hydrogen,
    a water-gas shift reactor receiving the output from the gas generator for converting the ratio of hydrogen to carbon monoxide to about three to one,
    a gas purifier receiving the output from the reactor for removing impurities from the reactor output,
    a methanation unit receiving the hydrogen and carbon monoxide output from the purifier and forming methane,
    an air plant receiving air and having an output of oxygen which is supplied to the gas generator, and an output of nitrogen,
    a liquefied natural gas line in a heat exchange relationship with the air plant,
    a liquefied natural gas unit connected to the gas line and separating the rich ends from the lean ends of the liquefied natural gas,
    means for combining the lean ends with a portion of the nitrogen from the air plant to provide a synthetic pipeline gas of desired heating value, and
    means for combining the rich ends with the methane to form a synthetic pipeline gas of desired heating value.

2. The apparatus of claim 1 including,
    a waste heat boiler receiving the output from the gas generator in a heat exchange relationship with water forming steam which is supplied to the gas generator.

3. The apparatus of claim 1 including,
    recycling means for recycling part of the output of the methanation unit to the input of the methanation unit through a heat exchange relationship with the nitrogen from the air plant.

4. The apparatus of claim 1 including,
    a hydrogasification unit receiving the rich ends from the liquefied natural gas unit and receiving part of the hydrogen and carbon monoxide from the gas purifier for forming a methane rich gas, the output of the hydrogasification unit being connected to the output of the methanation unit.

5. The apparatus of claim 1 including,
    a carbon and ash removal unit receiving the carbonaceous material input and connected to and transmitting the output of the carbon and ash removal unit to the gas generator for fuel, and
    said carbon and ash removal connected to the output of the gas generator for removing molecular carbon, ash and metallic materials therefrom.

6. The apparatus of claim 4 including,
    a carbon and ash removal unit receiving the carbonaceous material and connected to and transmitting the output of the carbon and ash removal unit to the gas generator for fuel, and
    said carbon and ash removal connected to the output of the gas generator for removing molecular carbon, ash and metallic materials therefrom.

7. The apparatus of claim 6 including,
    a waste heat boiler receiving the output from the gas generator in a heat exchange relationship with water forming steam which is supplied to the gas generator.

8. The apparatus of claim 7 including,
    recycling means for recycling part of the output of the methanation unit to the input of the methanation unit through a heat exchange relationship with the nitrogen from the air plant.

References Cited

UNITED STATES PATENTS

| | | | |
|---|---|---|---|
| 3,194,644 | 7/1965 | Gorin et al. | 48—202 X |
| 3,407,052 | 10/1968 | Huntress et al. | 48—196 |
| 3,527,585 | 9/1970 | Ungerleider | 48—196 |
| 3,556,749 | 1/1971 | Spacil | 48—202 X |

MORRIS O. WOLK, Primary Examiner

R. E. SERWIN, Assistant Examiner

U.S. Cl. X.R.

48—180 R, 197 R, 215